US007111278B1

(12) United States Patent
Siska, Jr.

(10) Patent No.: US 7,111,278 B1
(45) Date of Patent: Sep. 19, 2006

(54) AUTOMATED TRANSLATION OF A MICROPROCESSOR OPCODE SUMMARY TABLE TO AN ARCHITECTURE DESCRIPTION LANGUAGE

(75) Inventor: Charles Paul Siska, Jr., Costa Mesa, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/516,318

(22) Filed: Mar. 1, 2000

(51) Int. Cl.
*G06F 9/45* (2006.01)
(52) U.S. Cl. .................. 717/106; 717/136; 717/141
(58) Field of Classification Search ............... 717/106, 717/136, 140, 146, 159; 703/14–16; 716/1, 716/3
See application file for complete search history.

(56) References Cited

U.S. PATENT DOCUMENTS 6,385,757 B1 * 5/2002 Gupta et al. .................. 716/1

OTHER PUBLICATIONS

Ramsey et al., "Specifying Representations of Machine Instructions", ACM Transactions on Programming Languages and Systems, vol. 19, No. 3, May 1997, pp. 492-524.*
Pees et al., "Retargetable Compiled Simulation of Embedded Processors Using a Machine Description Language", ACM Transactions on Design Automation of Electronic Systems, vol. 5, No. 4, Oct. 2000, pp. 815-834.*
Davidson et al., "Design Principles for Machine-Description Language", pp. 1-21.*
Siska, Chuck. "A Processor Description Language Supporting Retargetable Multi-Pipeline DSP Program Development Tools".*
Russo et al., "Automatic Architecture Evealuation for Hardware/Software Codesign", IEEE, 1999, pp. 47-53.*

Knoll et al., "Automated Generation of DSP Program Development Tools Using a Machine Description Formalism+", IEEE 1993, pp. I-457 to I-460.*
Zhu et al., "Retargetable Binary Utilities", DAC 2002, ACM, 2002, pp. 331-336.*
Chung et al., "Fast System Development Tools Prototyping Using a Machine Instruction Set Description Language".*
Hanono et al., "ISDL: An Instruction Set Description Language for Retargetability", ACM Inc., 1997, pp. 1-4.*
Russo et al.; "Automatic Architecture Evaluating For Hardware/Software Codesign"; IEEE, 1999; pp. 47-53.*
Hadjiyiannis et al., "ISDL: An Instruction Set Description Language for Retargetability," in *Proceedings of the 34th Annual Conference on Design Automation Conference*, Anaheim, California, 1997, pp. 299-302.
Qin, W. and S. Malik, "Architecture Description Languages for Retargetable Compilation," in the Compiler Design Handbook: *Optimizations and Machine Generation*, Y.N. Srikant and Priti Shankar, CRC Press, 2002.

* cited by examiner

*Primary Examiner*—Kakali Chaki
*Assistant Examiner*—William H. Wood
(74) *Attorney, Agent, or Firm*—Akin Gump Strauss Hauer & Feld LLP (57) ABSTRACT

A method of automatically translating an opcode summary table into an Architecture Description Language ("ADL") can be employed to efficiently design and test a microprocessor instruction set. An opcode summary table is analyzed and code is generated in an ADL. The generated code can be optimized by first analyzing the opcode summary table to find groupings and sub-groupings of instructions based on similarities. The optimized code can be generated by first generating code for common elements within the sub-group, then generating code for each instruction within the sub-group. This process would repeated for each group in the opcode summary table. The result is an ADL description of the opcode summary table.

20 Claims, 7 Drawing Sheets

```
operation Ld_St_Imm_group
{ // The Load-Store Halfword Immediate Group
composition
      {
      // select one of the four the instructions
      inst = (LDRH || LDRSB || LDRSH || STRH)
      // and include their operand fields.
      && cond && P && U && W && Rn && Rd
      && immed // immed is a joining of immedH and immedL.
      }
coding
      { // concatenate the opcode and operand fields
      self = cond:4 ## 0:3 ## P:1 ## U:1
      ## 1:1 ## W:1
      ## inst[2:2]:1 // the bit after the "W" operand.
      ## Rn ## Rd
      ## immed[4:7]:4 // immedH field.
      ## 1:1
      ## inst[1:0]:2 // the 2 bits between immedH & L.
      ## 1:1
      ## immed[0:3}:4 // immedL field.
      }
}
```

Figure 4

```
operation Ld_St_half_group
{
  composition
  {
    // select one of the four the instructions.
    grp = (Ld_St_Imm_group || Ld_St_Reg_group)
    // and include their operand fields.
    && cond && P && U && W && Rn && Rd
  }
  coding
  { // concatenate the opcode and operand fields
    self = cond:4 ## 0:3 ## P:1 ## U:1
           ## grp[11:11]:1 // 1st "*", the immed/reg indicator bit.
           ## W:1
           ## grp[10:10]:1 // 2nd "*", the first inst opcode bit.
           ## Rn ## Rd
           ## grp[9:6]:4  // 3rd "*", the immedH field, or 0's.
           ## 1:1
           ## grp[5:4]:2  // 4th "*", the other inst opcode bits.
           ## 1:1
           ## grp[3:0]:4  // 5th "*", the immedL or Rm field.
  }
}
```

Figure 5

```
operation Ld_St_Imm_group
{
  composition
  {
    // select one of the four the instructions.
    inst = (LDRH || LDRSB || LDRSH || STRH)
    // and include their operand fields.
    && immed // immed is a joining of immedH and immedL.
  }
  coding
  { // blindly concatenate the opcode and operand fields
    self = 1:1 // imm indicator, opcode bit before "W" field.
           ## inst[2:2]:1 // the bit after the "W" operand.
           ## immed[4:7]:4 // immedH field.
           ## inst[1:0]:2 // the 2 bits between immedH & L.
           ## immed[0:3]:4 // immedL field.
  }
}
```

Figure 6

```
operation Ld_St_Reg_group
{
  composition
  {
    // select one of the four the instructions.
    inst = (LDRH || LDRSB || LDRSH || STRH)
    // and include their operand fields.
    && Rm // the extra register operand.
  }
  coding
  { // blindly concatenate the opcode and operand fields
    self = 0:1 // reg indicator, opcode bit before "W" field.
           ## inst[2:2]:1 // the bit after the "W" operand.
           ## 0:4 // equivalent to immedH field.
           ## inst[1:0]:2 // the 2 bits between immedH & L.
           ## Rm:4
  }
}
```

AUTOMATED TRANSLATION OF A MICROPROCESSOR OPCODE SUMMARY TABLE TO AN ARCHITECTURE DESCRIPTION LANGUAGE

A portion of the specification contains material which is subject to copyright protection. The owner has no objection to the facsimile reproduction by anyone of the specification, as it appears in the Patent and Trademark Office patent file or records, but otherwise reserves all copyright rights whatsoever.

BACKGROUND OF THE INVENTION

1. Technical Field

The present invention generally relates to the field of microprocessor development, and more particularly to techniques for automating the production of a hierarchical processor/architecture description language representation of a microprocessor.

2. Background Information

A microprocessor acts as the "brain" of a computer, processing instructions at a high rate; the prior art is replete with various microprocessor designs, architectures, configurations, processing schemes, and coding techniques. The power of a microprocessor is its ability to perform instructions very quickly. In order to process an instruction, a microprocessor requires the information to be in a particular format, called a "machine language." This machine language, which is the basic binary language for the computer instructions, differs depending on the specific microprocessor. Although microprocessors utilize binary machine language, it is much easier to write instructions for a computer if the instructions are alphanumeric, a format more easily understood by humans. This can be done through the use of "high-level languages," such as C++ and BASIC, or assembly language. Assembly language is more directly related to a microprocessor's machine language as each assembly language instruction represents a machine language instruction with mnemonic text instead of a binary format.

Microprocessor designers balance many considerations during the development of a microprocessor. One important consideration is the actual functionality of the microprocessor. A microprocessor must have a plurality of instructions to be useful. The term "instruction set" is used for the set of all of the instructions utilized by a microprocessor. The description of the instruction set and the functions of each instruction is called an "instruction set architecture" ("ISA"). An ISA is generally viewed in terms of three portions: the assembly language mnemonic for each of the instructions, the machine language encoding of the instructions, and the operation of the instruction.

Designers traditionally describe the ISA of a processor/architecture in terms of an opcode summary table. An opcode summary table is a table which lists the assembly language mnemonic for each instruction, the machine language bit pattern encoding for each instruction, and the position of the operands within the instruction.

Each bit in an instruction has a different function. The portion of the instruction that determines which instruction is to be performed is termed the opcode. For a simple instruction set, the opcode may take 6 bits out of the 32 bits available for each instruction. The operand is the remainder of the instruction and determines, for example, what register is being operated upon, or what memory location is to be accessed.

When designing a new microprocessor, the designers must be able to test their designs to find any problems and optimize the performance. Testing the designs involves the use of assemblers, compilers, and simulators ("programming tools") to test the operation of the microprocessor. An assembler is a program that translates assembly language mnemonics to the processor's machine language. A compiler transforms a high-level language, such as BASIC or C++, to the processor's machine language. A simulator simulates the operation of the microprocessor by performing each function of the microprocessor on an already existing computing platform. A simulator thus enables one to test a microprocessor without having to first physically build it.

To automate the creation of those programming tools, several Architecture Description Languages ("ADL") have been developed, such as nML, ISDL, LISA, and RADL. It is possible to describe each instruction using an ADL. For many instruction sets, however, similar instructions have similar machine language formats with common shared fields. Using an ADL, one can group similar instructions together to create a more compact representation of the processor. This compact representation is also less prone to errors because similar groups of instructions need be described only once, with only the differences further delineated.

The power of an ADL lies in the fact that, using an ADL description of a microprocessor, one can automatically create various programming tools for that processor. In order to create, for example, an assembler for a microprocessor, one may write a program in ADL that describes the microprocessor. Then, an assembler generator could be used to create an assembler from the ADL description of the microprocessor. In order to create a simulator, one would also need to input the behavior of each instruction into the ADL description into the simulator generator.

In the past, the creation of an ADL description of a microprocessor was manually performed by a person, given the assembly language instructions and its machine language representation. However, when developing new microprocessors, the manual creation of these programs can delay the development of the new microprocessors by two to three weeks.

After the programming tools are created, the new microprocessor is tested. Once tested, the design may be improved in various ways, including modifying the instruction set. Once the product is improved, new programming tools must be created, which results in additional delays associated with the re-coding of the ADL. Furthermore, the ADL code must be debugged before it can reliably be used to test the microprocessor.

Another problem with the ADL is the learning curve. A microprocessor designer would have to learn how to code in a language that may be new to them. A microprocessor designer may be more concerned with producing the physical embodiment of the microprocessor chip, rather than the production of programming tools. Many designers are also more comfortable with the traditional methods of describing a microprocessor, such as an opcode summary table. Thus, many designers spend their time producing documentation related to the operation of the microprocessor.

To facilitate the design of microprocessors, it is desirable to automate the process of producing an ADL representation of a microprocessor.

BRIEF DESCRIPTION OF THE DRAWINGS

The invention is further described in connection with the accompanying drawings, in which like element numbers denote like elements.

DETAILED DESCRIPTION OF THE INVENTION

The present invention may be described herein in terms of functional block components and various processing steps. It should be appreciated that such functional blocks may be realized by any number of hardware components configured to perform the specified functions. For example, the present invention may be implemented by various integrated circuit components, e.g., memory elements, logic elements, look-up tables, and the like, which may be used to carry out a variety of functions under the control of one or more microprocessors or other control devices. In addition, those skilled in the art will appreciate that the present invention may be realized in a software or computer program context in conjunction with any number of conventional computer system environments.

It should be appreciated that the particular implementations and processes shown and described herein are illustrative of the invention and its best mode and are not intended to otherwise limit the scope of the present invention in any way. Indeed, for the sake of brevity, conventional microprocessor programming, instruction set encoding, instruction set design, and software programming techniques may not be described in detail herein.

Figure 1:
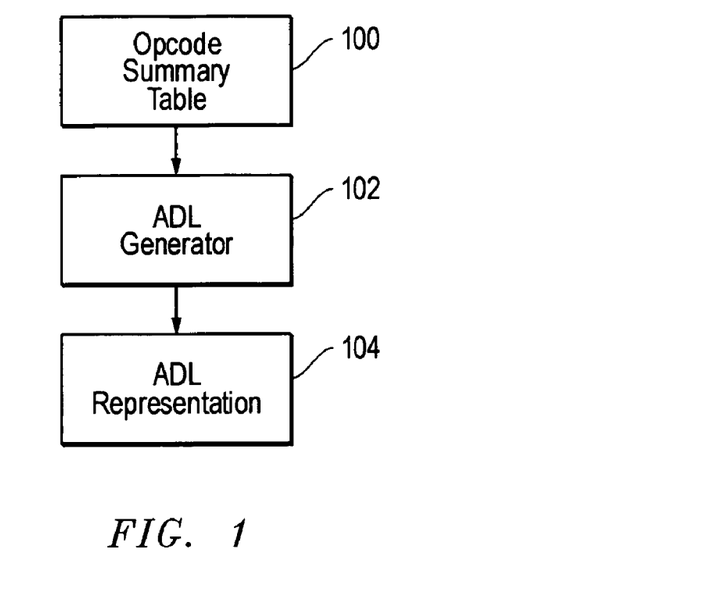
FIG. 1 is a flow diagram of an opcode translation procedure.

FIG. 1 is a flow diagram that depicts the operation of one preferred embodiment of the present invention. The technique shown in FIG. 1 is performed by a suitable computing system, e.g., a personal computer having a sufficient amount of processing power and a sufficient memory capacity.

Briefly, the technique summarized in FIG. 1 automatically transforms an electronic version of an opcode summary table 100 into an ADL representation 104. Opcode summary table 100 (which may be configured as an electronic data file such as a spreadsheet) serves as an input to an ADL generator 102. ADL generator 102 is preferably configured to: analyze the instructions contained in opcode summary table 100, identify or locate groups of similar instructions; and produce an ADL representation 104, which is associated with opcode summary table 100. Eventually, ADL generator 102 produces, outputs and/or saves ADL representation 104, which may be realized as an electronic file or a computer program that may be stored on a hard disk drive, a floppy disk, a ZIP disk, or any other equivalent electronic storage media as is known by those skilled in the art. The characteristics and functions of opcode summary table 100, ADL generator 102, and ADL representation 104 are described in more detail below.

ADL generator 102 is preferably configured as a software program that can read opcode summary tables in a variety of formats. As such, ADL generator 102 contains multiple sections of program code optimized to operate on a computer system comprising a processor, Random Access Memory (RAM), a data storage element (such as a hard disk drive, or a ZIP drive), a display means (such as a monitor or a printer), and an input device or user interface (such as a keyboard or a mouse). The opcode summary table 100 can be provided in a spreadsheet format, a comma-separated value format, or any other database format commonly used to store data in table format. In order to create a more compact and efficient representation of the microprocessor instructions, ADL generator 102 preferably scans opcode summary table 100 to find similarities between instructions. The operation of the ADL generator is described in more detail below, with respect to FIG. 8. Thereafter, ADL representation 104 can be generated for the groupings of instructions and stored on the storage element or other suitable media for further use as described in conjunction with FIG. 2.

Figure 2:
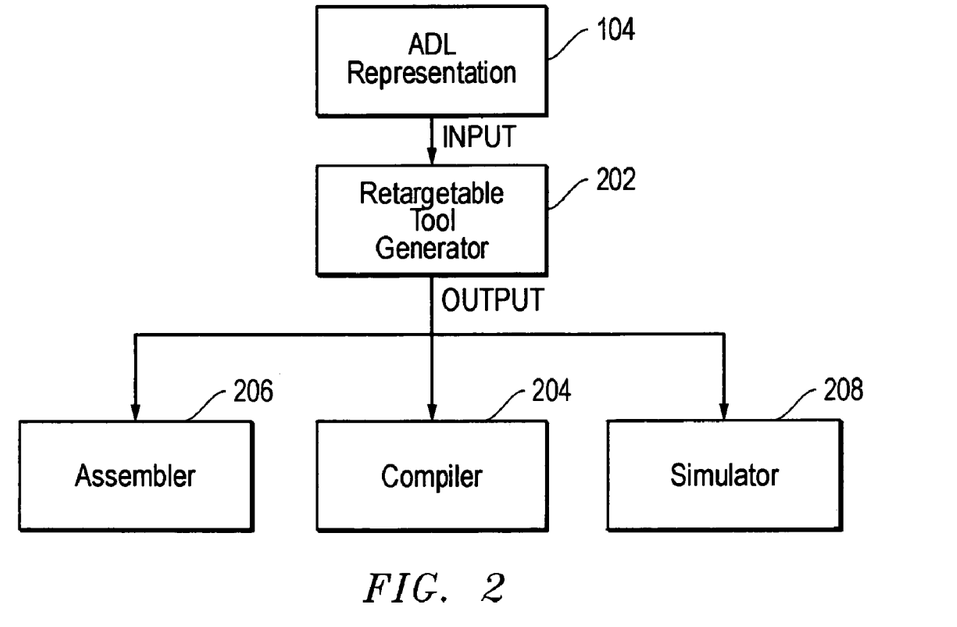
FIG. 2 is a schematic representation of a design/test environment in which an Architecture Description Language is used.

FIG. 2 is a schematic representation of a design/test environment 200 in which ADL representation 104 may be used. As described briefly above, ADL representation 104 is preferably configured as an electronic computer file representing a compact version of opcode summary table 100. ADL representation 104 is associated with the design and functionality of the particular microprocessor that is under development. In accordance with one exemplary embodiment of the present invention, ADL representation 104 is provided as an input into a Retargetable Tool Generator 202. Retargetable Tool Generator 202 is capable of generating "tools" such as a compiler 204, an assembler 206, and a simulator 208.

The operation of Retargetable Tool Generator 202 is well known to those skilled in the art. Retargetable Tool Generator 202 is typically a software program running on a computer system, e.g., a system as described above. When an ADL representation 104 is input into Retargetable Tool Generator 202, Retargetable Tool Generator 202 processes the representation and generates tools, such as a compiler, assembler, or simulator, as an output in the form of electronic files or computer programs. These "tools" operate independent of the ADL representation and of the Retargetable Tool Generator. A microprocessor designer can thereafter use compiler 204, assembler 206, and simulator 208 to test the microprocessor in accordance with well known test procedures and techniques.

Figure 7:
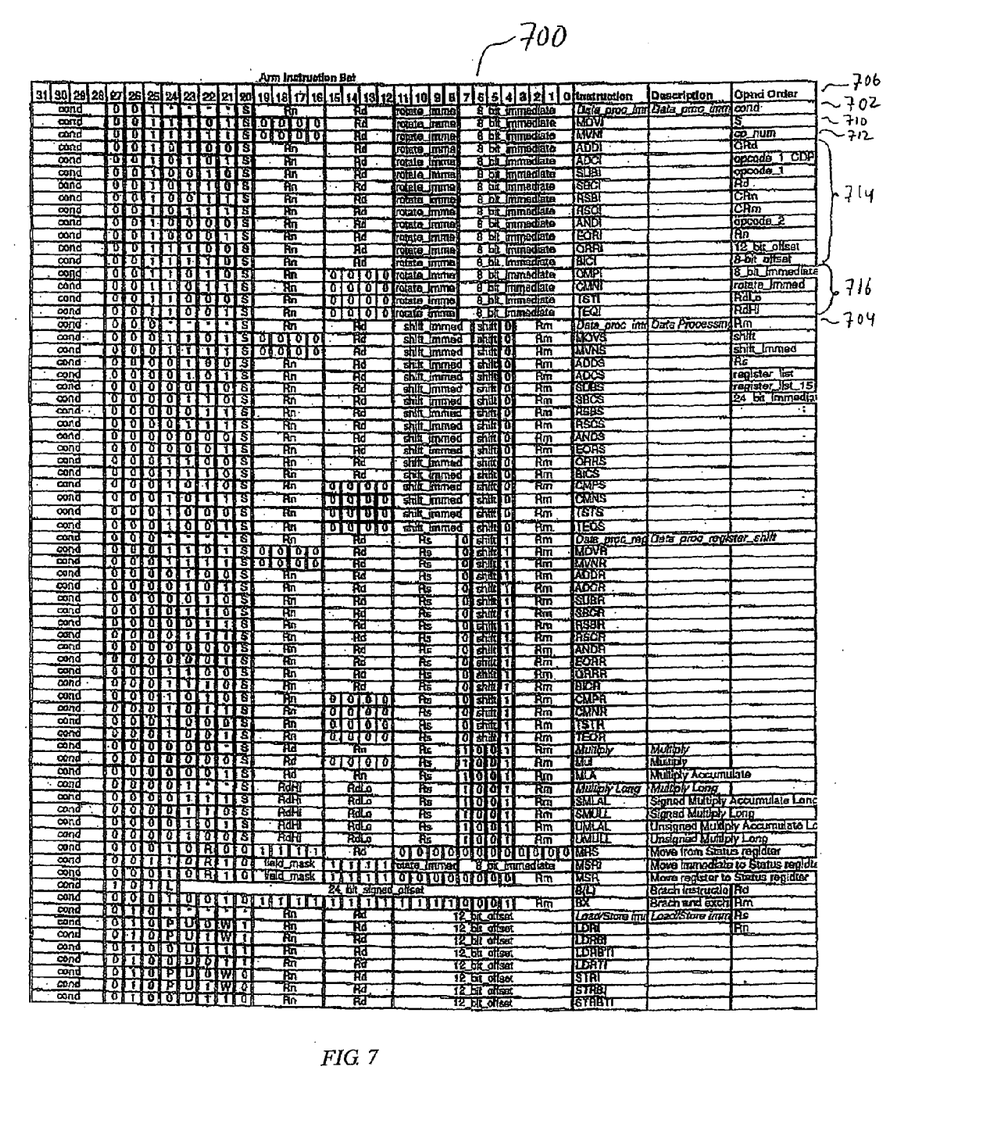
FIG. 7 is an illustrative opcode summary table.

As mentioned above, opcode summary table 100 includes a plurality of instructions that govern the operation of the microprocessor. In accordance with microprocessor design conventions, the instructions are represented by a number of line entries, each of which may include a mnemonic for the instruction, an encoded machine language bit pattern, the position of operands within the instruction, and the like. FIG. 7 depicts one exemplary opcode summary table for a practical microprocessor design. For exemplary purposes, the instruction set for the ARM7TDMI CPU core produced by ARM Ltd., is shown. It should be understood, however, that the ADL generator will operate on the opcode summary table of any processor. As shown, FIG. 7 includes a number of line entries relating to the individual instructions. The first row of opcode summary table is a header row that identifies the different fields in the table: the columns labeled 31 to 0 contains bit positions 31 to 0, respectively, of each instruction (each instruction is 32 bits long); the column labeled "Instruction" contains the assembly mnemonic for each instruction; the column labeled "Description" is an optional field to describe the operation of the instruction; the column labeled "Opnd Order" is used by the ADL generator to determine what bit positions 31-0 represent. The manner in which the instructions are grouped in opcode summary table is described in more detail below.

Table 1 depicts an illustrative opcode summary table having four instructions taken from a practical microprocessor design. The first row is a header showing how many bits are in each column. For example, each instruction contains 32 bits and the first column contains 4 bits. Each column represents a specific portion of an instruction. For example, the first four bits is the COND field. As shown in Table 1, the four instructions have certain shared characteristics. Of the 32 bits in each of the instructions, 29 of them are identical.

Table 2 depicts one manner in which the shared characteristics of the instructions shown in Table 1 may be represented. As shown, the common fields and bits are maintained, while the bit positions that do not share common values are represented by an asterisk. For example, an asterisk is placed in the filed immediately following the "W" because this bit position is a "1" for only three of the four instructions. Accordingly, the representation shown in Table 2 illustrates the portions of the opcode bit pattern encoding which are common to all of the opcode entries represented in their base group.

TABLE 2

| The Common fields of the Group of Instructions of Table 1 | | | | | | | | | | | | | | | | |
|---|---|---|---|---|---|---|---|---|---|---|---|---|---|---|---|---|
| 4 | 1 | 1 | 1 | 1 | 1 | 1 | 1 | 1 | 4 | 4 4 | 1 | 1 | 1 | 1 | 4 |
| cond | 0 | 0 | 0 | P | U | 1 | W | * | Rn | Rd immedH | 1 | * | * | 1 | immedL |

Figure 3:
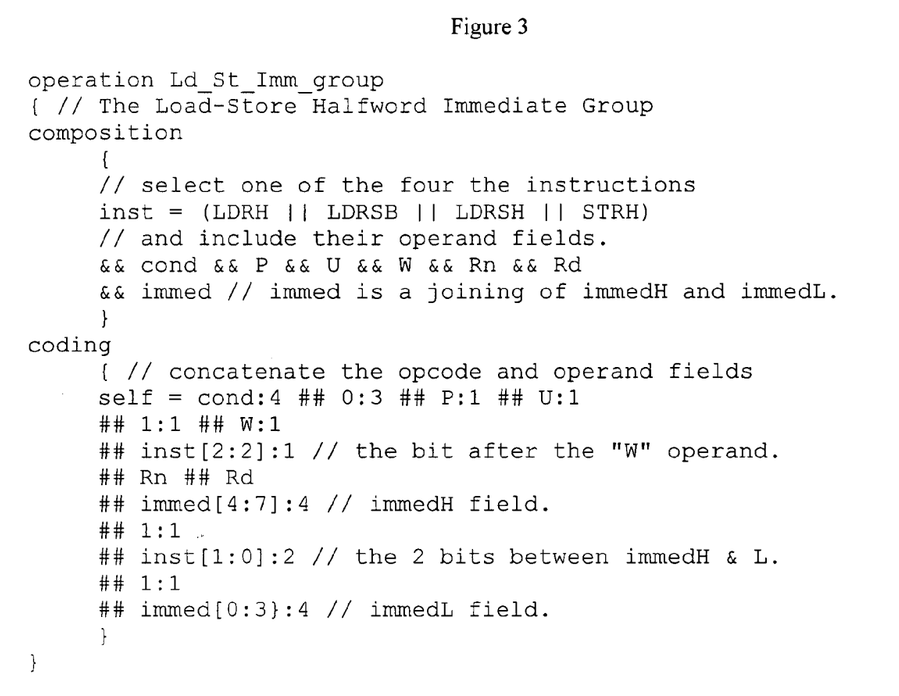
FIG. 3 is an exemplary RADL encoding of the instructions shown in Table 1.

For illustrative purposes, the ADL representation of the group of opcodes depicted in Tables 1 and 2 is shown in FIG. 3, using a particular ADL called RADL. While the ADL representation is shown in RADL, it should be understood that the ADL generator can be configured to produce an ADL representation in a number of different ADLs, such as nML, ISDL, or LISA. This representation is one practical implementation of element 104 from FIGS. 1 and 2 and can be used in the manner described above with respect to FIGS. 1 and 2.

Multiple groups having similar instruction formats may be combined into "super groups" in a manner similar to that described above. For example, Table 3 shows two instruction groupings from one exemplary instruction set. As shown, each of the instruction groupings represents a plurality of individual instructions that differ in those bit positions identified by the asterisks. Furthermore, each of the two instruction groupings share characteristics. However, there are a few differences between the two instruction groupings. For example, the two instruction groupings differ in that the first instruction grouping uses an immediate field ("immedL") and the second instruction grouping uses a register field ("Rm"). There may also be other differences between the two instruction groupings.

TABLE 1

| Opcode Summary Table of an Exemplary Group of Instructions | | | | | | | | | | | | | | | | | |
|---|---|---|---|---|---|---|---|---|---|---|---|---|---|---|---|---|---|
| 4 | 1 | 1 | 1 | 1 | 1 | 1 | 1 | 1 | 4 | 4 | 4 | 1 | 1 | 1 | 1 | 4 | // Opcode Name |
| cond | 0 | 0 | 0 | P | U | 1 | W | 1 | Rn | Rd | immedH | 1 | 0 | 1 | 1 | immedL | // LDRH |
| cond | 0 | 0 | 0 | P | U | 1 | W | 1 | Rn | Rd | immedH | 1 | 1 | 0 | 1 | immedL | // LDRSB |
| cond | 0 | 0 | 0 | P | U | 1 | W | 1 | Rn | Rd | immedH | 1 | 1 | 1 | 1 | immedL | // LDRSH |
| cond | 0 | 0 | 0 | P | U | 1 | W | 0 | Rn | Rd | immedH | 1 | 0 | 1 | 1 | immedL | // STRH |

TABLE 3

Two illustrative instruction groupings

| 4 | 1 | 1 | 1 | 1 | 1 | 1 | 1 | 1 | 4 | 4 | 4 | 1 | 1 | 1 | 1 | 4 |
|---|---|---|---|---|---|---|---|---|---|---|---|---|---|---|---|---|
| cond | 0 | 0 | 0 | P | U | 1 | W | * | Rn | Rd | immedH | 1 | * | * | 1 | immedL |
| cond | 0 | 0 | 0 | P | U | 1 | W | * | Rn | Rd | 0 0 0 0 | 1 | * | * | 1 | Rm |

Table 4 depicts a super group associated with the two instruction groupings shown in Table 3. Referring again to Table 3, the two instruction groupings are further differentiated in the following manner: the bit immediately following the "W" is different; the four bits immediately following the "Rd" field are different; and (as mentioned above) the last four bits are different. The condensed representation shown in Table 4 includes asterisks in those additional fields, resulting in a total of six variable fields. The remaining fields are common between the two instruction groupings. Thus, the ADL description can be further optimized by "super grouping" in this manner.

TABLE 4

The Super Group formed from Table 3

| 4 | 1 | 1 | 1 | 1 | 1 | 1 | 1 | 1 | 4 | 4 | 4 | 1 | 1 | 1 | 1 | 4 |
|---|---|---|---|---|---|---|---|---|---|---|---|---|---|---|---|---|
| cond | 0 | 0 | 0 | P | U | * | W | * | Rn | Rd | * | 1 | * | * | 1 | * |

Figure 4:
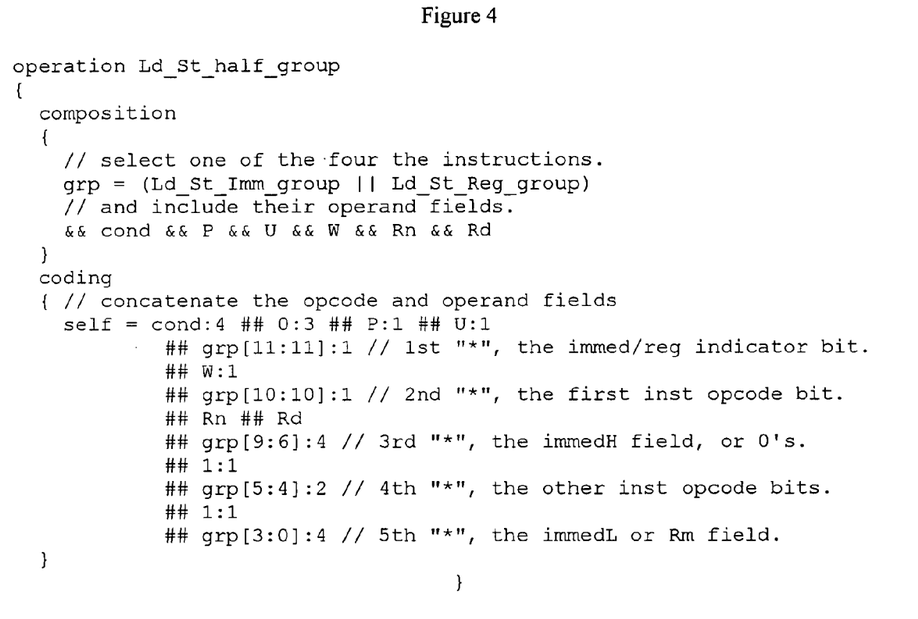
FIG. 4 is an exemplary RADL encoding of the super group associated with Table 4.

For illustrative purposes, the encoding of the common fields of the group of opcodes depicted in Table 4 is shown in FIG. 4 using a RADL representation. As described above, such RADL encoding is merely one practical way in which ADL representation 104 (see FIGS. 1 and 2) may be realized for this super group of instructions.

Figure 5:
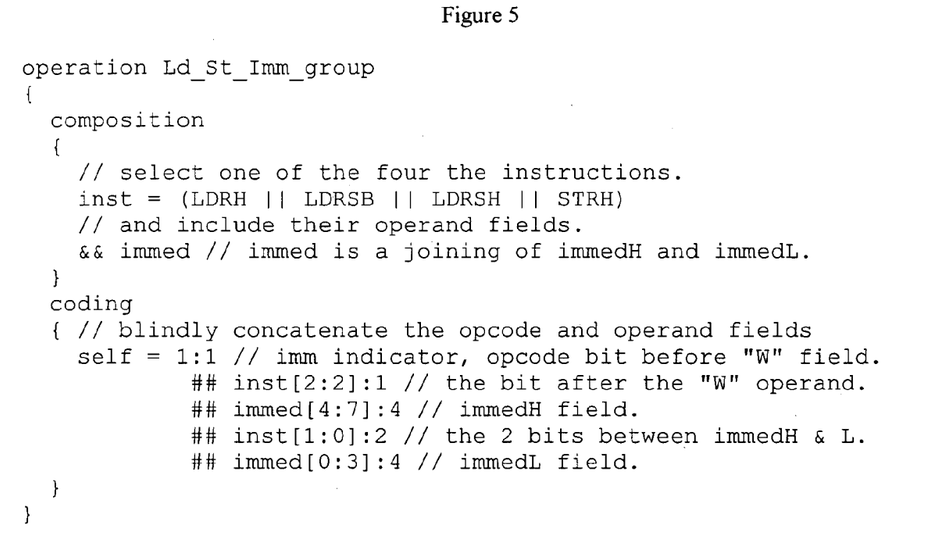
FIG. 5 is an exemplary RADL encoding of the first group of instructions shown in Table 2.
Figure 6:
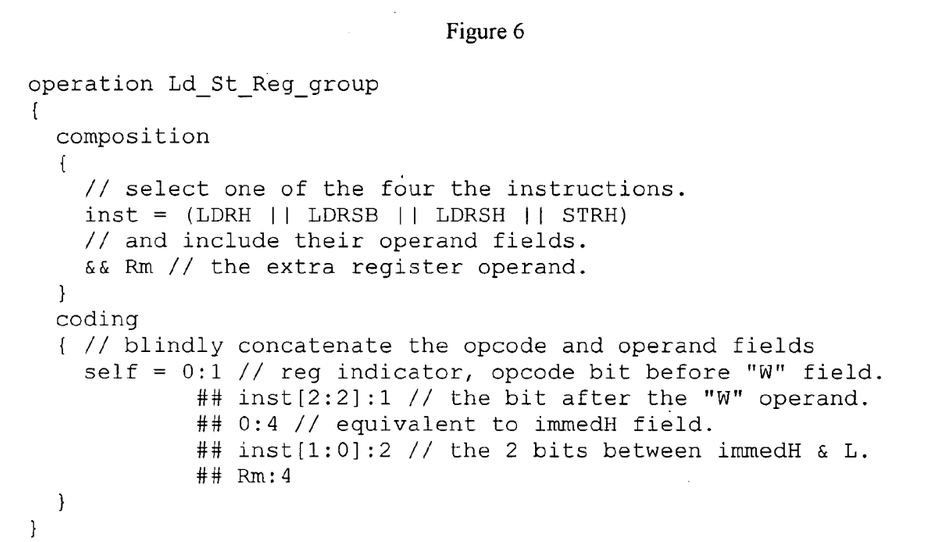
FIG. 6 is an exemplary RADL encoding of the second group of instruction shown in Table 2.

When the super group shown in Table 4 is assumed, the two base groups shown in Table 3 can be more succinctly described, as shown in FIGS. 5 and 6. One can see the difference a super group makes by comparing the ADL representation of the Ld_St_1 mm_group in FIG. 5, with the earlier description of this same group in FIG. 3 when no super group was assumed to take care of shared operand and opcode fields: the ADL representation of FIG. 3 describes every bit position in the instructions, while the ADL representation of FIG. 5 only describes the bits not previously described in FIG. 4. Thus, the ADL representation FIG. 5 is used in conjunction with the ADL representation of FIG. 4. The result is that the ADL representation of FIG. 5 describes the unique features of a group of instructions more succinctly than the ADL representation of FIG. 3.

In a similar manner, the second group of instruction shown in Table 3 has an ADL representation as shown in FIG. 6. The ADL representation of FIG. 6, in conjunction with the ADL representation of FIG. 4, is yet another implementation of element 104 of FIG. 1 and can be used in the manner described above with respect to FIG. 2.

In a manner similar to that described above, a group of instructions can be broken down into smaller sub-groups. In this manner, ADL generator 104 starts with groups of instructions and builds sub-groups within the groups. Thus, instead of starting with groups of instructions and forming super groups, in effect, ADL generator 104 would be starting with super groups and forming groups within the super groups.

For example, with respect to FIG. 7, opcode summary table 700 is shown as being pre-formatted such that the individual instructions are already grouped in a suitable fashion. The pre-formatting of opcode summary table 700 would typically be performed by the microprocessor architects. The architects will typically design the microprocessor such that instructions that perform similar functions have similar instruction formats. Thus, the architects will create the opcode summary table such that the similar functions are together. While pre-formatting may not obtain the most efficient groupings of instructions, the architects may have conceptual reasons for grouping the instructions in a particular manner. Thus, the architect's groupings may either remain undisturbed, or the pre-formatted groupings can be ignored while new groupings are developed by ADL generator 102. Each group in opcode summary table 700 is identified through the use of italics in the row immediately preceding the group. Line 702 shows one grouping of similar instructions. (While it appears that line 702 contains a template for the grouping, the bit positions 31 to 0 of line 702 can be ignored by the ADL generator as it generates the ADL representation solely from the contents of the actual instructions). Line 704 identifies the second group of similar instructions and also delineates the end of the first group of instructions.

Several of the 16 instructions in the first group can be further combined into sub-groups; such sub-groups may include a plurality of instructions that are substantially similar (e.g., a plurality of instructions that only differ at one or two bit positions). For example, the first two instructions (instructions 710 and 712) differ by only one bit, i.e., bit position 22. However, the remaining instructions in the first group all differ in bit positions 19 through 16 from the first two instructions. It would thus be more efficient to group the two instructions 710 and 712 together as a separate sub-group because bits 19 through 16 are unique to those two instructions. Thereafter, each instruction can be described using the sub-group with only one unique bit. Similarly, a sub-group 714 can be formed separately from a sub-group 716 as bit positions 15 through 12 are different between these two sub-groups (in sub-group 714, these bit positions are identified by "Rd" and in sub-group 716, these bit positions are represented by "0000"). Thus, the group of 16 instructions delineated by line 702 can be further divided into at least three sub-groups.

It should be appreciated that the present invention may identify sub-groups based on any number of similarities, differences, or characteristics associated with the individual instructions. The grouping criteria may vary according to the particular microprocessor being designed, the particular instruction formats, and any other design parameters. In addition, the present invention can be configured to (1) initially form small groups followed by super groups; or (2) initially form large groups followed by a partition into sub-groups within the larger groups. Either configuration will result in functionally equivalent ADL representations.

A preferred embodiment of the invention is embodied in a software program. Such a software program can be configured to operate in a typical computer system comprising a CPU, a storage device (such as a hard disk drive or a CD-RW drive), a monitor, memory, and a keyboard or other means of input. At the user's command, the ADL generator would be loaded into memory and commence operation.

Figure 8:
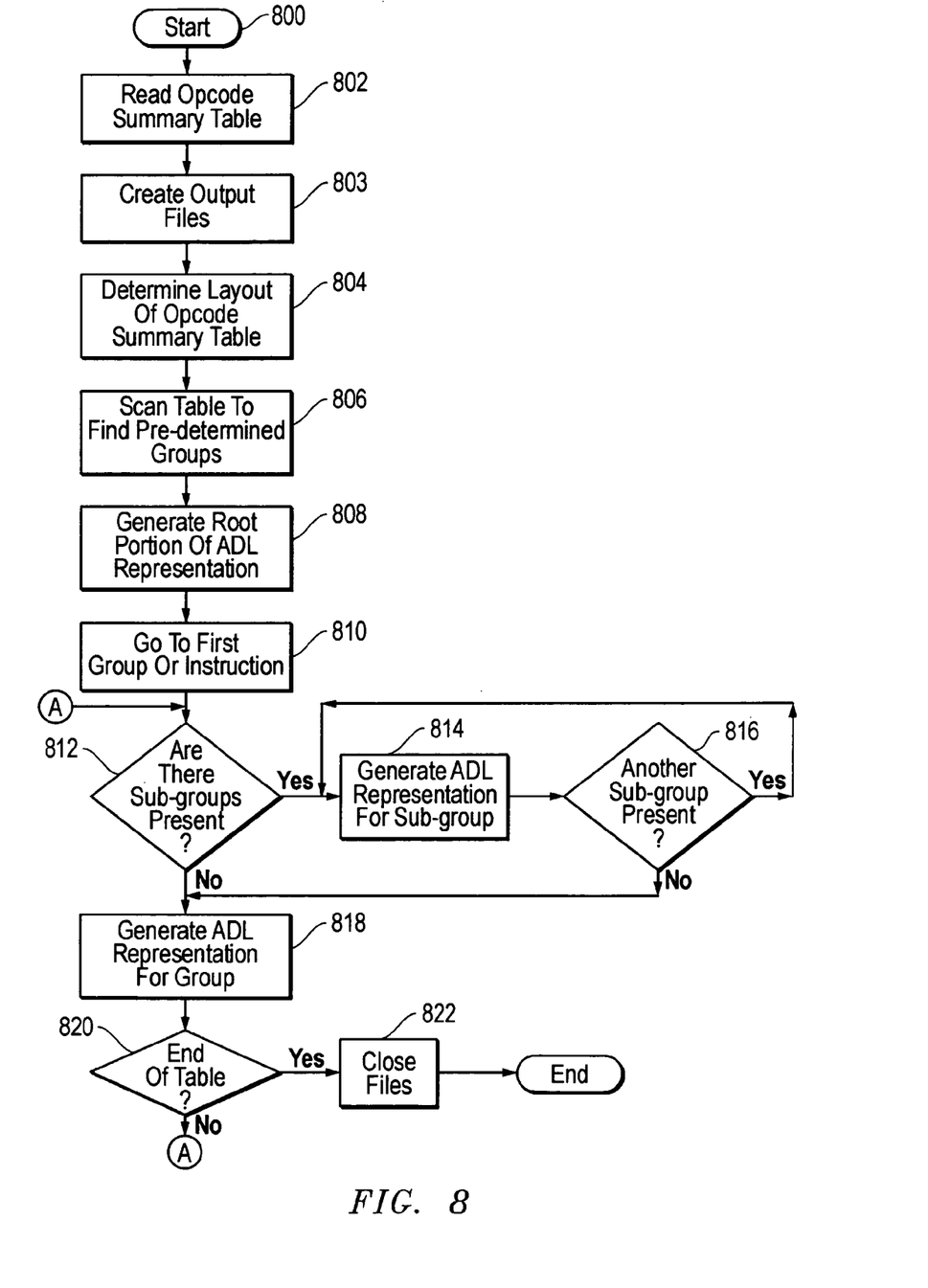
FIG. 8 is a flowchart illustrating an opcode summary table translation process according to a preferred embodiment of the present invention.

The operation of a preferred embodiment of the invention is shown in the flowchart shown in FIG. 8. First, an opcode summary table is read at step 802. As described above, a practical opcode summary table may be provided in an electronic format, e.g., a spreadsheet or a data file, such that the ADL generator can read the instructions contained in the opcode summary table. The table can be provided with initial groupings, sub-groupings, and/or super-groupings already made by the architects. However, the process shown in FIG. 8 will also operate on an opcode summary table that is not pre-formatted. The ADL generator then creates at least one file to which the generated ADL representation will be output (step 803). This file is typically created on the storage device, preferably a hard disk drive. Step 803 can be performed in any number of different ways, such as the OPEN instruction in Visual BASIC.

At step 804, the opcode summary table is scanned to determine its layout. During step 804, the ADL generator may examine the header line, such as line 706 of FIG. 7. In the context of the example embodiment described herein, ADL generator determines how wide the instructions are (in terms of bit length) and in which column the assembly language mnemonics are located. If the opcode summary table contains a column detailing the order of the operands in the instructions, the ADL generator may be configured to store the operand order to ease the generating of the ADL representation. The ADL generator may also determine if the opcode summary table is in the correct format, e.g., whether all of the expected columns are present and whether the table contains data. Step 804 is necessary to more efficiently generate the ADL representation.

At step 806, the ADL generator preferably scans the opcode summary table to determine if there are any pre-determined groups. This can be accomplished, for example, by determining if any of the instructions are italicized, such as line 702 from FIG. 7. If there are, the ADL generator stores the group name, for example, by storing the italicized name from the "Instruction" column. It also determines the number of groups in the opcode summary table. If ADL generator finds no groups, then the process merely proceeds to step 808.

At step 808, the ADL generator creates the first portion of the ADL representation 104. This portion is the "root" of the instruction "hierarchy," the one place from which all the instructions and their pieces can be found. The preferred embodiment contains the correct syntax and formatting for a particular ADL, such as nML or RADL, and thus always outputs the correct syntax and formatting when generating the ADL representation. The ADL generator is capable of concatenating the names of the pre-formatted groups such that the groups are set forth in proper ADL format. Step 808 is performed whether or not the ADL generator finds any pre-determined groups in the opcode summary table.

Following step 808, the ADL generator cycles to the first group, if present, at step 810. For any given group, the ADL generator can determine if there are any potential sub-groups within the group at step 812 and, if so, how many instructions are in that sub-group. The ADL generator preferably determines if sub-groups are needed by cycling through each instruction within a pre-determined group. Each instruction can be compared with the previous instruction, bit-by-bit, to identify any differences: if the value in a particular bit position is identical in the two instructions, then the next bit position is examined; if the only difference between the two bit positions is a change between a 1 and a 0, the next bit is examined; if there is a substantive change, then the instructions should not be in the same sub-group, and a new sub-group should be formed. This substantive change is illustrated, for example, in FIG. 7: the difference between group 714 and group 716 at bit position 15 is from "Rd" to 0, is a substantive change. A substantive change is any change other than 1 to 0 or 0 to 1. These include a change from a bit that represents a register to a bit that represents an immediate value or a change from a bit that is either a 1 or 0 to a bit that represents, for example, a register. With reference to FIG. 7, the substantive changes are those from "0000" to either "Rn" or "Rd."

Another illustrative example of finding sub-groups is as follows. With reference to FIG. 7, the only difference between line 710 and 712 is the change from a 0 to a 1 in bit position 22. Thus, no new sub-group need be formed because the difference is not substantive as it is only a change from a 0 to a 1. However, the difference between line 712 and the first instruction in group 714 is a change from "0000" to "Rn" at bits 19 through 16. Thus, in the context of this embodiment, the ADL generator would designate a new sub-group because this is a substantive change. This sub-group would continue until group 716 is reached, as explained above.

If ADL generator discovers a sub-group, then step 814 is performed to generate the ADL representation for that sub-group at 814. Then the ADL generator finds the next sub-group and generates the ADL representation for that sub-group. This loop continues until there are no more sub-groups in this group. The ADL representation for the current group is then generated at step 818, whether or not there were any sub-groups.

The ADL representation for either the sub-group or group is generated by determining the location of the differences between instructions in a group. Then, the ADL representation for the portions that are identical are generated as being common to the group or sub-group. The ADL representation for the differences between the instructions are subsequently generated. The differences are generated by identifying which portions of the instructions are different and the manner in which they are different. For example, if the difference between the only two instructions in a sub-group is a change from a 1 to a 0 at a certain bit position, that position is identified.

Next, the ADL generator determines if the end of the opcode summary table has been reached at step 820. If the end has not been reached, the process is re-entered at step 812 and other groups are analyzed and coded. Once the end of the table has been reached, the file containing the ADL representation is closed at step 822 and the ADL representation of the microprocessor is complete. Closing the file is a process well known to those skilled in the art, involving marking the end of the file and preventing any further modifications to the file. This closing process can be accomplished, for example through the use of the Visual BASIC command CLOSE. This output file is complete and stored on the storage medium, preferably a hard disk drive or equivalent. The resulting output file is an ADL representation equivalent to element 104 of FIG. 1. This representation contains the ADL description of all the instructions in the opcode summary table. This representation can then be used as described in conjunction with FIG. 2.

If the opcode summary table contains no pre-determined groups, then the ADL generator cycles through the instructions and automatically forms sub-groups, as described above, by analyzing each instruction and comparing it to the previous instruction, bit-by-bit.

The above description presents the best mode contemplated in carrying out the invention. The techniques described above are, however, susceptible to modifications and alternate constructions from the embodiments shown above. For example, the ADL generation process can be modified to further form super groups made up of multiple, smaller groups. In addition, the ADL generator can be modified to generate code in a number of different ADLs. Furthermore, while the forming of sub-groups was described as being accomplished by comparing an instruction to the previous instruction, each instruction could be compared to all of the instructions in order to form optimized groups or sub-groups. In addition, the formation of groups need not be performed at all; the ADL generator may create an ADL representation by separately coding each instruction in an opcode summary table.

Consequently, it is not the intention to limit the invention to the particular embodiments disclosed. On the contrary, the invention is intended and shall cover all modifications and alternate constructions falling within the spirit and scope of the invention, as expressed in the following claims when read in light of the description and drawings.

I claim:

1. A computerized method for producing code in an architecture description language, said method comprising:
   reading an opcode summary table having entries representing a plurality of instructions;
   analyzing said opcode summary table to determine a layout of said opcode summary table;
   grouping instructions from the opcode summary table into groups according to bit similarities between the instructions evaluated as a whole;
   generating code for an instruction in architecture description language format based on at least one of the groups; and
   repeating said generating for each group derived from said opcode summary table, resulting in an architecture description language (ADL) representation of the opcode summary table.

2. The method of claim 1 where the opcode summary table is provided in a spreadsheet.

3. The method of claim 1 where the opcode summary table is provided in a comma separated value format.

4. The method of claim 1, wherein the representation of structure comprises an ADL representation of a microprocessor.

5. The method of claim 1, wherein the representation of structure comprises an ADL microprocessor representation utilizable by an assembler generator.

6. The method of claim 1, wherein the representation of structure comprises an ADL microprocessor representation utilizable by a simulator generator.

7. A computerized method for producing code in an architecture description language format, said method comprising:
   reading an opcode summary table having entries representing a plurality of instructions;
   analyzing said opcode summary table to determine a layout of said opcode summary table;
   grouping instructions from the opcode summary table into groups according to bit similarities between the instructions evaluated as a whole;
   determining a beginning of a group from said opcode summary table;
   generating root code for a hierarchy in architecture description language format based on at least one of said groupings;
   cycling through each group to generate detailed code in architecture language format; and
   repeating said cycling until an end of the opcode summary table is reached.

8. The method of claim 7 where the opcode summary table is provided in a spreadsheet.

9. The method of claim 7 where the opcode summary table is provided in a comma separated value format.

10. The method of claim 7 where the opcode summary tablet is pre-formatted such that the opcodes are separated into groups prior to being read.

11. The method of claim 7 where said cycling further comprises determining a presence of sub-groups within at least one of said groups and generating detailed code for each sub-group within said at least one group.

12. A computer program embodied in at least one machine-readable medium, the computer program comprising:
   a first computer code section to read an opcode summary table having a plurality of entries representative of a like plurality of microprocessor instructions;
   a second computer code section to produce a grouping of at least two of said entries in accordance with a grouping criteria, including grouping instructions from the opcode summary table into groups according to bit similarities between the instructions evaluated as a whole; and
   a third computer code section to generate an encoded representation of said grouping, wherein the encoded representation of said grouping includes an Architecture Description Language representation.

13. A computerized method for producing code in an architecture description language, said method comprising:
   reading an opcode summary table having a plurality of entries representing a corresponding plurality of instructions;
   analyzing said opcode summary table to determine a layout of said opcode summary table and constructing an opcode super group based on at least two opcode groups identified by said analyzing, including grouping instructions from the opcode summary table into groups according to bit similarities between the instructions evaluated as a whole; and
   generating code for an instruction in architecture description language format based on said opcode super group.

14. A computerized method for producing code in an architecture description language format, said method comprising:
   reading an opcode super group table having a plurality of entries representing a corresponding plurality of instructions;

analyzing said opcode super group table to determine a layout of said opcode super group table;

determining a presence of a sub-group from said opcode super group table, including a sub-group of instructions that have been grouped together based on bit similarities between the instructions evaluated as a whole;

generating root code in architecture description language format based on the sub-group;

cycling to generate detailed code for the sub-group in architecture description language format; and repeating said cycling and determining until an end of the opcode super group table is reached.

15. A computer program embodied in at least one machine-readable medium, the computer program comprising:

a first computer code section to read an opcode summary table having a plurality of entries representative of a like plurality of microprocessor instructions;

a second computer code section to produce a first grouping of at least two of said entries in accordance with a grouping criteria, including grouping instructions from the opcode summary table into groups according to bit similarities between the instructions evaluated as a whole;

a third computer code section to produce a second grouping of at least two of said entries in accordance with a grouping criteria, including grouping instructions from the opcode summary table into groups according to bit similarities between the instructions evaluated as a whole;

a fourth computer code section to produce a super grouping of the first and second groupings; and a fifth computer code section to generate an encoded representation of said super grouping, wherein the encoded representation of said grouping includes an architecture description language representation.

16. A method for producing code in an architecture description language (ADL), the method comprising:

reading an opcode summary having entries representing a plurality of instructions;

analyzing the opcode summary to determine a layout of the opcode summary;

grouping instructions from the opcode summary into groups according to bit similarities between the instructions evaluated as a whole:

generating code for an instruction in ADL format based on the groups;

repeating the generating for each line in group derived from the opcode summary, resulting in an ADL representation of the opcode summary; and using the ADL representation as input to generate a simulator tool.

17. A computerized method for producing code in an architecture description language (ADL) format, the method comprising:

reading an opcode summary having entries representing a plurality of instructions;

analyzing the opcode summary to determine a layout of the opcode summary;

grouping instructions from the opcode summary into groups according to bit similarities between the instructions evaluated as a whole:

determining a beginning of a group from the opcode summary;

generating root code for a hierarchy in ADL format based on the grouping;

cycling through each group to generate detailed code in ADL format;

repeating the cycling until an end of the opcode summary is reached; and using at least some of the code in ADL format as input to generate a simulator tool.

18. An article of manufacture, comprising:

a machine-readable medium having instructions stored thereon, the instructions including:

first instructions to read an opcode summary having a plurality of entries representative of a like plurality of microprocessor instructions;

second instructions to produce a grouping of at least two of the entries in accordance with a grouping criteria, including grouping instructions from the opcode summary into groups according to bit similarities between the instructions evaluated as a whole;

third instructions to generate an encoded representation of the grouping in ADL format; and fourth instructions to use the encoded representation in ADL format to generate a simulator tool.

19. A system, comprising:

a means for reading an opcode summary having entries representing a plurality of instructions;

a means for analyzing the opcode summary to determine a layout of the opcode summary;

a means for grouping instructions from the opcode summary into groups according to bit similarities between the instructions evaluated as a whole;

a means for generating code for an instruction in architecture description language (ADL) format based on the groups; and a means for repeating the code generation for sections of the opcode summary, resulting in an ADL representation of the opcode summary.

20. The system of claim 19, further comprising means for simulating operation of a processor using the ADL representation of the structure.

* * * * *